(12) United States Patent
Lau et al.

(10) Patent No.: US 8,294,328 B2
(45) Date of Patent: *Oct. 23, 2012

(54) BRUSH GEAR OF A MOTOR

(75) Inventors: James Ching Sik Lau, Hong Kong (CN); Duncan Yiu Lung Wong, Hong Kong (CN); Chang Lin Jin, Shenzhen (CN); Aloys J. Liu, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 351 days.

This patent is subject to a terminal disclaimer.

(21) Appl. No.: 12/545,395

(22) Filed: Aug. 21, 2009

(65) Prior Publication Data

US 2010/0045136 A1 Feb. 25, 2010

(30) Foreign Application Priority Data

Aug. 22, 2008 (CN) .......................... 2008 1 0141965

(51) Int. Cl.
*H02K 13/00* (2006.01)

(52) U.S. Cl. ......................................... 310/239; 310/71
(58) Field of Classification Search .................. 310/248, 310/71, 239
See application file for complete search history.

(56) References Cited

U.S. PATENT DOCUMENTS

| 2,524,284 A | * | 10/1950 | Branson | 236/99 R |
| 3,504,328 A | * | 3/1970 | Olsson | 439/79 |
| 4,074,162 A | * | 2/1978 | Parzych | 310/245 |
| 5,689,148 A | * | 11/1997 | Rubinchik | 310/239 |
| 5,729,064 A | * | 3/1998 | Noguchi et al. | 310/68 R |
| 5,773,907 A | * | 6/1998 | Rubinchik | 310/248 |
| 5,973,433 A | * | 10/1999 | Kiehnle et al. | 310/239 |
| 6,081,056 A | | 6/2000 | Takagi et al. | |
| 8,049,391 B2 | * | 11/2011 | Lau et al. | 310/239 |
| 2010/0045135 A1 | * | 2/2010 | Lau et al. | 310/239 |
| 2010/0045136 A1 | * | 2/2010 | Lau et al. | 310/239 |

FOREIGN PATENT DOCUMENTS

| CN | 1190500 A | | 8/1998 |
| CN | 1193419 A | | 9/1998 |
| GB | 2291276 | * | 1/1996 |

* cited by examiner

*Primary Examiner* — Karl Tamai
(74) *Attorney, Agent, or Firm* — Muncy, Geissler, Olds & Lowe, PLLC

(57) ABSTRACT

Brush gear of a motor has a brush card with a plurality of brushes installed at one side thereof. Each brush is electrically connected with a connector. Two motor terminations provide power to the brushes via the corresponding connectors and at least one wire connects two of the connectors. Each of said two of the connectors has a hole to receive one end of the wire and at least two fingers extends from an edge of the hole inclined toward the axis of the hole, such that when the end of the wire extends through the hole, the fingers are resiliently deformed and grip the wire to prevent withdrawal of the wire from the hole.

9 Claims, 4 Drawing Sheets

BRUSH GEAR OF A MOTOR

CROSS REFERENCE TO RELATED APPLICATIONS

This non-provisional patent application claims priority under 35 U.S.C. §119(a) from Patent Application No. 200810141965.7 filed in The People's Republic of China on Aug. 22, 2008.

FIELD OF THE INVENTION

This invention relates to an electric motor and in particular, to brush gear of a motor.

BACKGROUND OF THE INVENTION

For electric motors, especially PMDC motors, with 4 or more stator poles, it is usual to have the same number of brushes as stator poles, cooperating with a commutator to energize the rotor windings in the correct sequence. The brushes are divided into two groups with all the brushes within each group being electrically connected together. Some recent improvements in motor design use equalizers or electrical connections to join together various segments of the commutator, such as diametrically opposed segments for a four pole motor, to reduce the number of brush sets. However, this means that the remaining brushes must carry greater current and this is not always possible or desirable. To avoid using equalizers, the brushes are electrically connected by using lead wires which are connected together outside of the motor. This is considered unsightly and clumsy. One solution has been to insert mold strips of metal into the card which supports the brush assemblies and connect the strips to the motor terminals or even form the motor terminals from the strips, with the brush assemblies being connected, usually by the brush shunts, to the appropriate metal strip. This is a good solution but requires a relatively large brush card and an expensive insert molding process. It is proposed to use internal links in the form of wires to connect the brushes of each brush group. However, welding inside the brush card is difficult and prevents miniaturization due to the area required to make a good weld connection.

Hence there is a desire for a simple arrangement for connecting a wire to a connector in associated brush assemblies of a motor, especially a four pole PMDC motor.

SUMMARY OF THE INVENTION

Accordingly, in one aspect thereof, the present invention provides brush gear of a PMDC motor comprising: a brush card; a plurality of brushes installed at one side of the brush card, each brush being electrically connected with a connector; two motor terminations for providing electrical power to the brushes via the corresponding connectors; and at least one wire connecting two of the connectors; wherein each of said two of the connectors has a hole to receive one end of the wire and at least two fingers extending from an edge of the hole and inclined toward the axis of the hole, such that when the end of the wire extends through the hole, the fingers are resiliently deformed and grip the wire to prevent withdrawal of the wire from the hole.

Preferably, the wire has a soldered tip at each end thereof, and when the tip extends through the hole, solder is scraped off from the tip and retained between the fingers and the wire to increase the electrical contact area between the finger and the corresponding wire.

Preferably, each of said two of the connectors comprises a mounting plate in which the hole is formed, the mounting plate is attached to said one side of the brush card.

Preferably, each of the connectors comprises a first portion connected to a shunt of the corresponding brush, the motor terminations each having an end connected to the first portion of a corresponding connector, with a corresponding shunt.

Preferably, the brush card has at least one channel in an opposite side thereof and two through holes at ends of the channel, the at least one wire is disposed in the channel and the tips of the wire extend through the respective through holes before extending through the holes of the connectors.

Preferably, the at least one wire is flexible.

Preferably, the at least one wire is a single core wire with enamel insulation.

Alternatively, the at least one wire is a multi-strand wire.

Preferably, the at least one wire is a copper wire.

Preferably, the brush gear comprises two pairs of brushes and two wires each connecting one pair of brushes, each of the motor terminations being connected to one pair of brushes.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
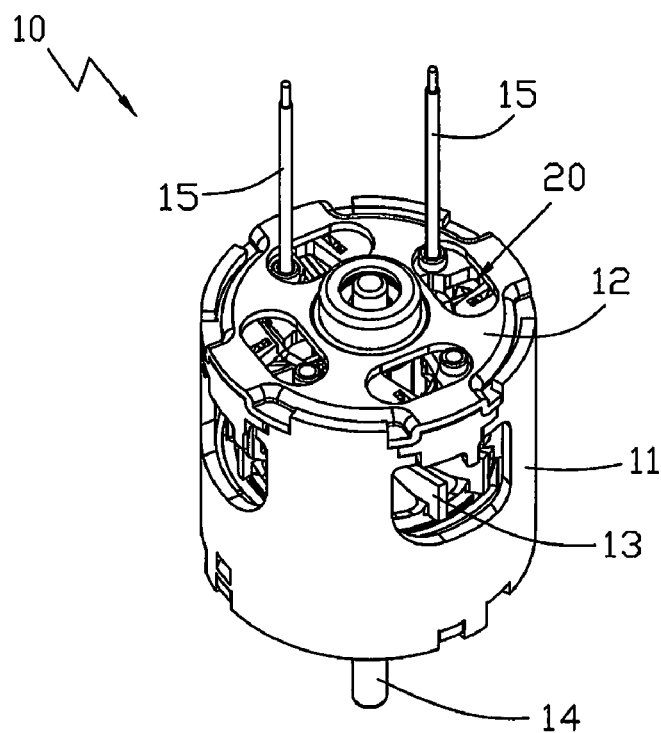
FIG. 1 is an isometric view of an electric motor in accordance with a preferred embodiment of the present invention.

FIG. 1 illustrates a multi-pole PMDC motor 10 in accordance with the present invention. PMDC stands for permanent magnet direct current and the motor has a permanent magnet stator comprising an magnetic housing accommodating either separate permanent magnet pieces or a single magnet formed into a ring and magnetized to form a number of magnetic poles. Multi-pole refers to a motor having four or more stator poles. The illustrated motor has four stator poles for simplicity of description but the invention is applicable to motors with more than four stator poles.

The motor has an end cap 12 closing one end of the housing 11 and a rotor 13 disposed within the housing 11. The rotor has a shaft 14 which is journalled in bearings. The rotor is a wound rotor having a rotor core and a commutator fitted to the shaft and rotor windings wound about the rotor core and connected to the commutator. A fan may be fixed to the rotor for cooling the motor. Motor terminations 15, illustrated in the form of lead wires, are provided for connecting the motor to a source of electrical power. The end cap 12 supports a brush card assembly 20 in that the end cap fixes the brush card with respect to the housing 11.

Figure 2:
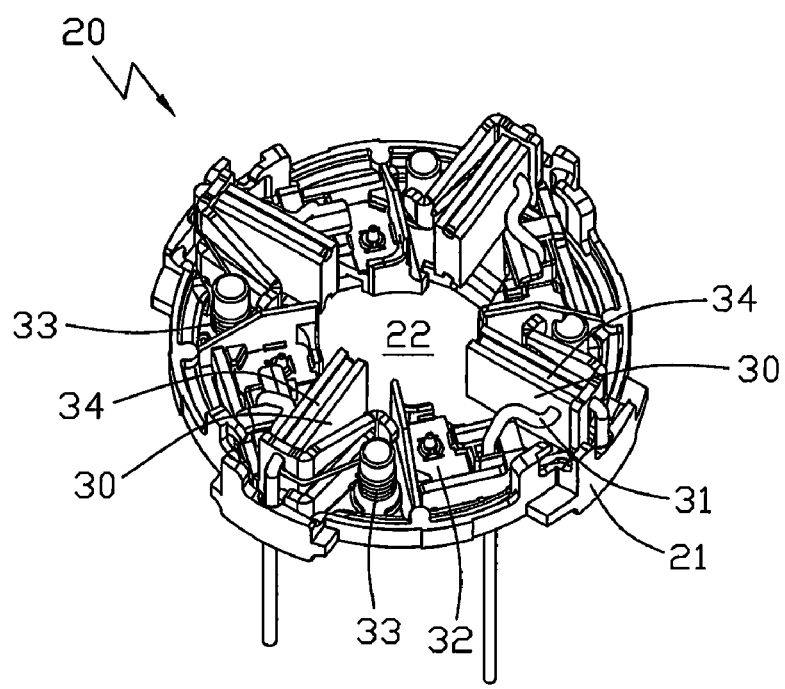
FIG. 2 is an isometric view of a brush card, being a part of the motor of FIG. 1.

The brush card assembly 20 is shown in FIG. 2. The assembly comprises a brush card 21 having a central opening 22 arranged to receive the commutator. The brush card supports a number of brush assemblies, in this example, four brush assemblies with diametrically opposed brushes forming a brush group.

Each brush assembly comprises a brush 30 adapted to make sliding contact with the commutator, a shunt 31 connecting the brush to a connector 32 and a brush guidance mechanism. The brush guidance mechanism includes a spring 33 for resiliently urging the brush into contact with the commutator and means for guiding the brush to the commutator. The guiding means may be a standard brush cage, the spring itself or as shown in the preferred embodiment a pair of rails 34 which are accommodated in grooves 35 in the brush 30 allowing the brush to slide along the rails only.

Figure 4:
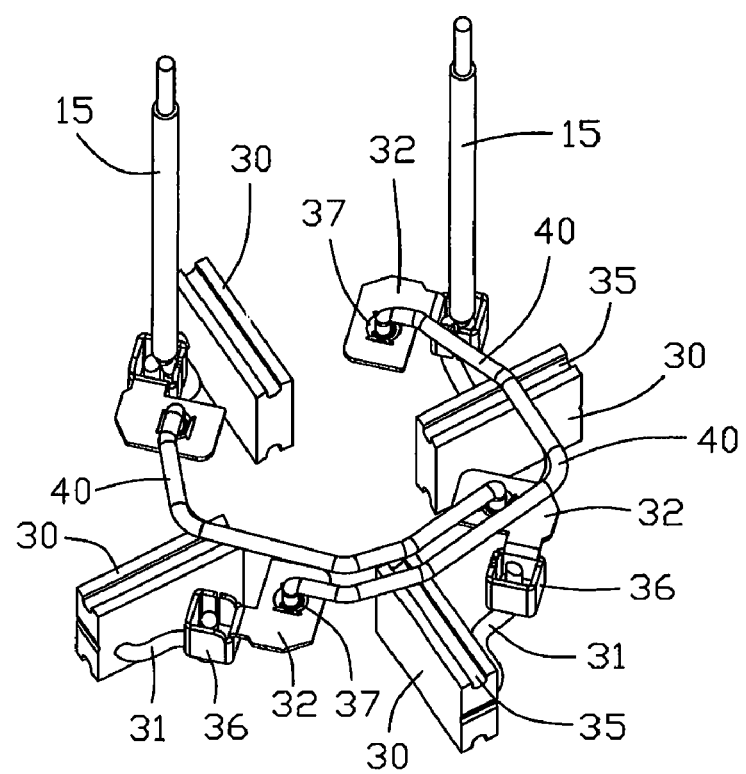
FIG. 4 is a schematic view similar to FIG. 3 with the brush card and various other components removed to show brushes, motor terminations and their interconnections.
Figure 7:
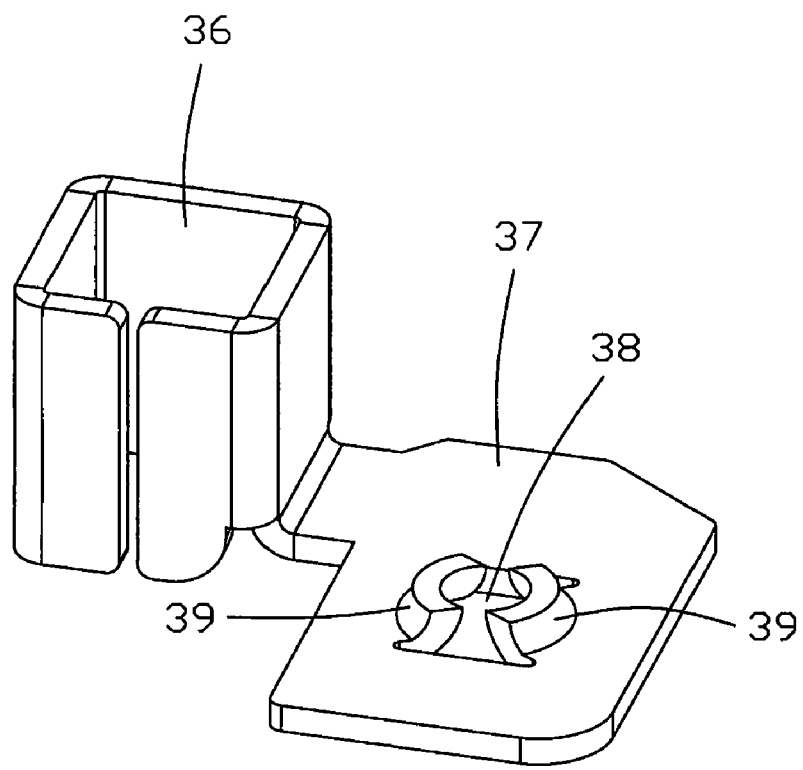
FIG. 7 is an isometric view of a connector, being a part of the brush card of FIG. 2.

The connector 32 has a first portion 36 and a second portion 37 as more clearly shown in FIG. 4 and FIG. 7. The first portion 36 is arranged to connect to the shunt 31 and if required to a motor lead wire 15. It is preferably a crimp terminal being of a cylindrical or tubular form in which the shunt and lead wire is disposed and then crimped to electrical and mechanically fixed the shunt and lead wire to the connector. As there are only two lead wires only two of the connectors are required to connect to the lead wires, one for each brush group. The second portion 37 forms a push in terminal having a through hole 38 and a pair of fingers 39 which extend from the edge of the hole radially inward and axially in the direction of insertion. The connectors 32 are fixed to the brush card 21 on the same side as the brushes 30 by a mounting plate, which is optionally a part of the second portion 37.

Figure 5:
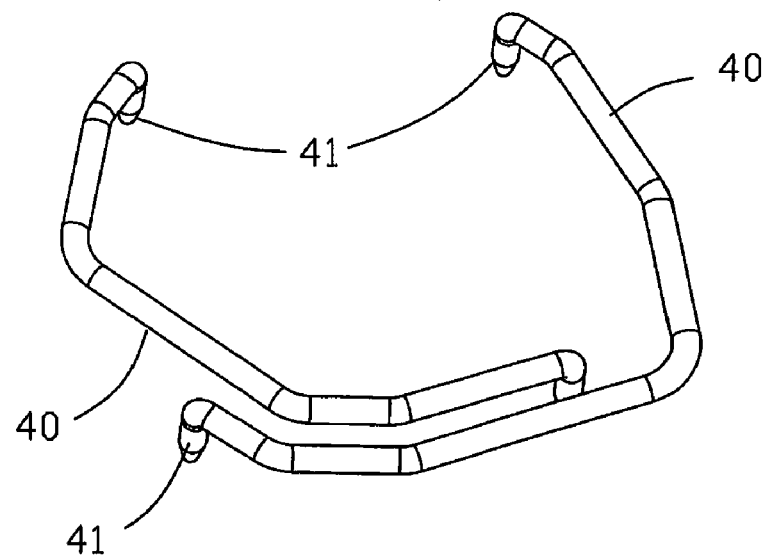
FIG. 5 is a schematic view of wires forming a part of the interconnections of FIG. 4.

To electrically connect together the brushes 30 of a brush group, links 40 formed by flexible wires extend between the connectors of a brush group. The links 40 have soldered tips 41 or end portions which are pressed into the push in terminals of the connectors. As the soldered tips 41 are pressed into the hole 38 they resiliently deform the fingers so as to part the fingers to allow passage of the tips 41. The fingers thus resiliently grip the tips and prevent the withdrawal of the tips. Attempts to withdraw the tips causes the fingers to bite into the tips. As the tips are being pushed passed the fingers, the fingers scrape off some of the solder on the fingers. The removed solder builds up under the fingers and creates a greater contact surface between the tips and the fingers reducing the contact resistance of the so formed connection. The flexible wire of the links may be multi-strand PVC insulated wire or preferably single core enamel insulated wire. Copper wire is preferred although other wire types such as aluminum wire may be suitable The soldered tips, especially on the multi-strand wire gives the tips greater integrity and resistance to damage when being inserted in the push in terminal. The single core wire of the links 40 is shown in FIG. 5, preformed ready to be fitted to the brush card with the tips bent at right angles to the body of the wire for insertion into the terminals.

Figure 3:
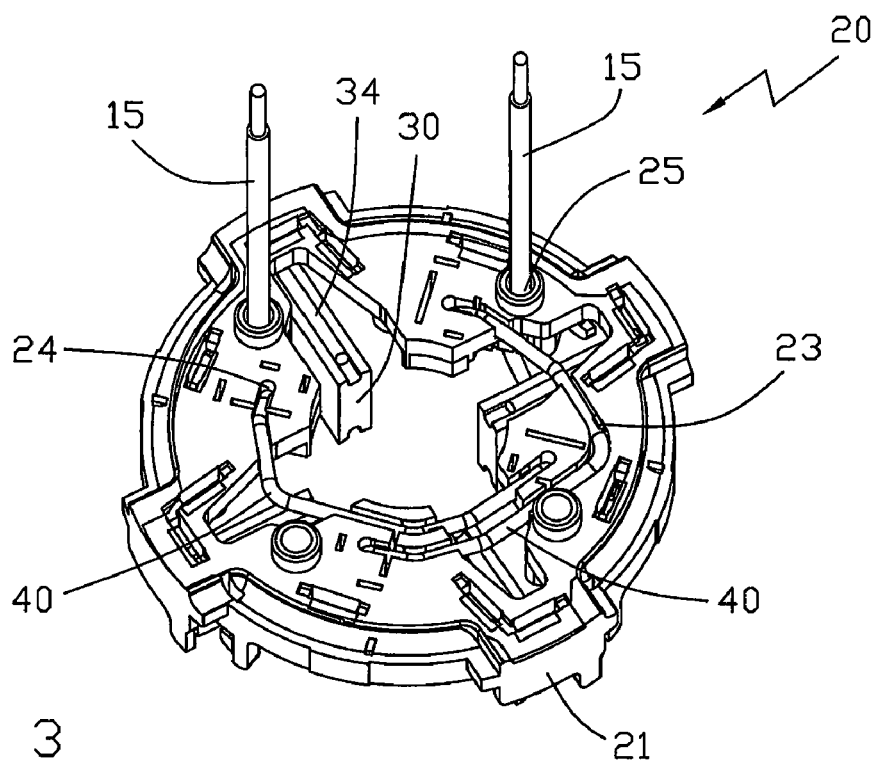
FIG. 3 is an isometric view from below of the brush card of FIG. 2.

FIG. 3 illustrates the reverse side of the brush card assembly 20 to that shown in FIG. 2. Here the links 40 are shown disposed in channels 23 connecting together link holes 24 (see FIG. 6) through which the tips 41 extend to engage with the connectors 32. The links may be captured within the channels, preferably by being a press fit within the channels. The use of insulated links means that there is greater freedom in locating the links as they can cross beneath a brush assembly, as shown in FIG. 3 with concern of causing a short circuit. This can not be done with insert molded links.

Figure 6:
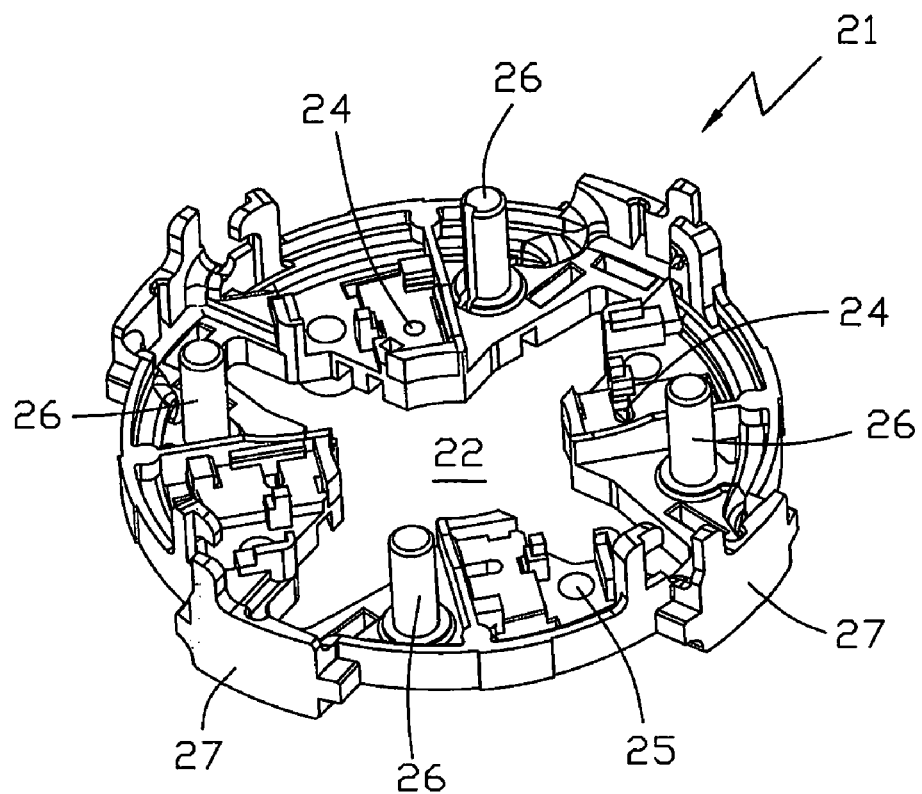
FIG. 6 is an isometric view of the bare brush card of FIG. 2.

The brush card 21 is shown bare in FIG. 6. The central opening 22 has peripheral slots for the brushes giving the opening 22 a crucifix form. Terminal holes are provided for passage of the motor terminations 15. Four posts 26 support and hold the springs 33. Four lands 27, appearing as peripheral extensions of the brush card are used to position the brush card within the housing 11 and cooperate with the end cap 12 to fix the brush card in position.

FIG. 7 is an enlarged view of one of the connectors 32 in which the push in terminal is shown having two fingers 39 which are arcuate so as to better conform to the surface of the tips of the links. The curved shape of the fingers makes better contact with the tips and gives a wider area for the build up of the scraped solder. They also scrape a wider strip of solder from the tips.

Figure 8:
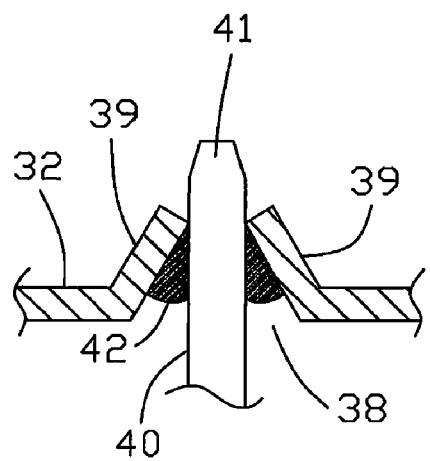
FIG. 8 is a schematic sectional view of a part of the connector of FIG. 7 illustrating the connection with a wire of FIG. 5.

The build up of scraped solder is schematically shown in the sectional view of FIG. 8. The scraped solder 42 is shown filling in an area between the fingers 39 and the tip 41.

In this manner, the present invention provides a simple solution to the problem of how to electrically connect together the brushes of brush groups without the need for insert molding of connector links.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, the motor terminations are shown and described as lead wires but could be other types of terminations such as for example male terminals formed integrally as part of two of the connectors.

Also, the push in terminal of the connector may have more or less than two fingers for scraping and gripping the tips of the links.

The invention claimed is:

1. Brush gear of a PMDC motor comprising:

a brush card;

a plurality of brushes installed at one side of the brush card, each brush being electrically connected with a connector;

two motor terminations for providing electrical power to the brushes via the corresponding connectors; and at least one wire connecting two of the connectors;

wherein each of said two of the connectors has a hole to receive one end of the wire and at least two fingers extending from an edge of the hole and inclined toward the axis of the hole, such that when the end of the wire extends through the hole, the fingers are resiliently deformed and grip the wire to prevent withdrawal of the wire from the hole; and wherein the wire has a soldered tip at each end thereof, and when the tip extends through the hole, solder is scraped off from the tip and retained between the fingers and the wire to increase the electrical contact area between the finger and the corresponding wire.

2. The brush gear of claim 1, wherein each of said two of the connectors comprises a mounting plate in which the hole is formed, the mounting plate is attached to said one side of the brush card.

3. The brush gear of claim 1, wherein each of the connectors comprises a first portion connected to a shunt of the corresponding brush, the motor terminations each having an end connected to the first portion of a corresponding connector, with a corresponding shunt.

4. The brush gear of claim 1, wherein the brush card has at least one channel in an opposite side thereof and two through holes at ends of the channel, the at least one wire is disposed in the channel and the tips of the wire extend through the respective through holes before extending through the holes of the connectors.

5. The brush gear of claim 1, wherein the at least one wire is flexible.

6. The brush gear of claim 5, wherein the at least one wire is a multi-strand wire.

7. The brush gear of claim 5, wherein the at least one wire is a single core wire with enamel insulation.

8. The brush gear of claim 5, wherein the at least one wire is a copper wire.

9. The brush gear of claim 1, wherein the brush gear comprises two pairs of brushes and two wires each connecting one pair of brushes, each of the motor terminations being connected to one pair of brushes.

* * * * *